3,425,996
HEXAFLUOROPHOSPHATES AS FIRST STAGE ADDITIVES
Mary E. Carter, Philadelphia, and John A. Price, Swarthmore, Pa., assignors to FMC Corporation, Philadelphia, Pa., a corporation of Delaware
No Drawing. Filed Oct. 3, 1966, Ser. No. 583,950
U.S. Cl. 260—75  7 Claims
Int. Cl. C08g 17/08

ABSTRACT OF THE DISCLOSURE

Process of preparing polyethylene terephthalate wherein terephthalic acid and ethylene glycol are esterified in the presence of a hexafluorophosphate esterification additive selected from the group having the formulas $M(PF_6)_x$ and $NH_4PF_6 \cdot NH_4F$, wherein M represents a metal from Groups I–A or VII of the Periodic Table or an $NH_4$-group or lower alkyl substituted $NH_4$-group to form a polyester prepolymer and then said prepolymer is polycondensed in the presence of a polycondensation catalyst.

---

This invention relates to a method of preparing filament-forming linear polyesters. In particular, it relates to a method of preparing polyethylene terephthalate resin having excellent filament-forming properties.

The manufacture of filament-forming polyester resin from a dicarboxylic acid and a diol is well-known in the art. Generally, in the preparation of such polyesters, a dicarboxylic acid and glycol are first combined and subjected to a direct esterification reaction. The resulting product or prepolymer is then polycondensed at higher temperatures and under reduced pressure in the presence of a polycondensation catalyst to form the desired filament-forming polyester resin. Various additives have been suggested heretofore for use in the first stage or esterification step to enhance the reaction. However, generally, none of these have proved entirely satisfactory since many of those known, for instance, are not capable of producing suitable prepolymers for preparing linear polyester resins having sufficiently high molecular weights within a relatively short reaction period. From a commercial standpoint, it is essential that a polyester resin be produced in the shortest possible time and that the desired degree of polymerization be obtained. A polyethylene terephthalate resin suitable for melt spinning into filaments should have a carboxyl content value of about below 50 equivalents per million grams (eq./$10^6$ gr. or meq./kg.), an intrinsic viscosity preferably not less than about 0.60 and a birefringent melting point of at least about 258°–260° C. Additionally, it is essential that such filaments be substantially colorless, possess a high degree of tenacity and hydrolytic and thermal stability.

It is an object of this invention to prepare polyethylene terephthalate resin suitable for melt extrusion into non-degraded processable filaments by a direct esterification and polycondensation procedure.

Another object of the present invention is to provide an improved method for completing the direct esterification reaction between ethylene glycol and terephthalic acid in the preparation of polyethylene terephthalate.

These and other objects are accomplished in accordance with the present invention which involves a method of preparing filament-forming polyethylene terephthalate wherein the terephthalic acid and ethylene glycol are directly esterified and the product of esterification is polycondensed in the presence of a condensation catalyst, the improvement comprising carrying out the direct esterification reaction in the presence of an additive compound, containing phosphorous in its highest oxdative state (+5) in the form of a fluoro complex anion, selected from the group having the formulas $M(PF_6)_x$ and $NH_4PF_6 \cdot NH_4F$, wherein M represents a metal from Groups I–A and VIII of the Periodic Table (see Merck Index, sixth edition, inside front cover) or an NH-group or substituted $NH_4$-group where at least one hydrogen atom has been substituted with a lower alkyl radical containing from about 1 to 6 carbon atoms, $x$ is 1 where M is a monovalent metal or an $NH_4$-group or substituted $NH_4$-group and $x$ is 2 where M is a divalent metal, in an amount sufficient to improve the properties of the resulting polyester.

The hexafluorophosphate compounds that are used in the direct esterification step of the present invention may be suitably varied to meet any requirements of reaction conditions and desired product. For example, among the first stage or esterification additives that can be used in accordance with the present method are cesium hexafluorophosphate, tetramethylammonium hexafluorophosphate, potassium hexafluorophosphate, nickel hexafluorophosphate, and ammonium hexafluorophosphate fluoride.

Generally, a catalytic quantity of the present hexafluorophosphate compounds in the range of from about $5 \times 10^{-6}$ to and $5 \times 10^{-2}$ mole per mole of terephthalic acid in the subject terephthalic acid-ethylene glycol reaction mixture is used in the present direct esterification method. Higher or lower concentrations of the present catalysts can also be used. However, when concentrations less than the above are used. However, when concentrations less than the above are used, their effectiveness is generally reduced whereas if concentrations greater than this are used, no further improvement in the present method or desired product is generally obtained.

In general, the preparation of filament-forming polyesters of the present invention via the direct esterification reaction is carried out with a molra ratio of ethylene glycol to terephthalic acid from about 1:1 to about 15:1 but preferably from about 1.2:1 to about 2.5:1. The first stage direct esterification step of the present method is generally carried out at temperatures ranging from about 220° C. to about 290° C. in the absence of an oxygen containing gas at atmospheric or elevated pressure for about three to five hours. For example, the reaction may be carried out in an atmosphere of nitrogen. The second stage or polycondensation step of the present method is generally carried out under reduced pressure within the range of from about 0.05 to 20 mm. of mercury in the absence of an oxygen containing gas at temperatures from about 260° to 325° C., for about two to six hours.

When the direct esterification step is completed, as indicated, for example, by collection of a clear distillate, any remaining glycol is distilled off and a polycondensation catalyst is added to the esterified reaction product.

The polycondensation step of the present method is accomplished through the use of a conventional condensation catalyst for example, antimony trioxide, antimony pentoxide, antimony trisulfide, antimony trifluoride, antimony triphenyl, zinc acetylacetonate, and the like. The polycondensation catalyst may be added to the present reaction mixture before initiating the first stage or direct esterification reaction between ethylene glycol and terephthalic acid or after the reaction product thereof is formed. The polycondensation catalysts are generally employed in concentrations ranging from about 0.005 to about 0.5%, based on the total weight of the reactants.

The process of this invention may be carried out either continuously or batch-wise.

The following examples of several preferred embodiments will further serve to illustrate the present invention. All parts are by weight unless otherwise indicated.

EXAMPLES

A mixture containing 84 grams (0.5 mole) of terephthalic acid, 62 grams (1.0 mole) of ethylene glycol, and $5 \times 10^{-5}$ mole of a hexafluorophosphate compound, as listed in the following table, with the exact weight used in the above reaction mixture, was charged to a Fischer-Porter pressure assembly equipped with a nitrogen sparge tube and a distilling arm. The reactor was lowered into an oil bath maintained at 260° C. and flushed for ten minutes with dry nitrogen. A nitrogen pressure of 60 p.s.i. was applied and a distillate of water-ethylene glycol was collected. When a clear liquid, i.e. solution, was obtained, the pressure was reduced to atmospheric and the remaining excess glycol was distilled. The resulting low molecular weight prepolymer was further reacted under a nitrogen blanket in the presence of 0.04%, based on the weight of the prepolymer, of a conventional polycondensation catalyst, e.g. antimony trioxide, under subatmospheric pressure of about 0.1 mm. of mercury for four hours at 282° C. to a high molecular weight polyester.

The following table sets forth conditions and results of various reactions carried out as described above.

TABLE

| Ex. No. | Esterification additive | Weight of hexafluorophosphate compound used, gm. | Esterification time, hrs.:mins. | Prepolymer carboxyl content, meq./pg. | Condensation catalyst | Intrinsic viscosity | Polymer carboxyl content, meq./kg. | Melting point, ° C. |
|---|---|---|---|---|---|---|---|---|
| 1 | None | | 3:40 | 316 | | 0.36 | | |
| 2 | Tetramethylammonium hexafluorophosphate | 0.0110 | 3:30 | 113 | Sb$_2$O$_3$ | 1.0 | 35 | 261 |
| 3 | Cesium hexafluorophosphate | 0.0139 | 3:05 | 184 | Sb$_2$O$_3$ [1] | 0.78 | 18 | 259 |
| 4 | Nickel hexafluorophosphate | 0.0174 | 5:00 | 18.0 | Sb$_2$O$_3$ | 1.00 | 27 | 258 |
| 5 | Potassium hexafluorophosphate | 0.0092 | 3:55 | 137 | Sb$_2$O$_3$ | 0.90 | 39 | 258 |
| 6 | Ammonium hexafluorophosphate fluoride | 0.0100 | 3:00 | 145 | Sb$_2$O$_3$ [2] | 0.72 | 29 | 260 |

[1] 2½ hours polycondensation time.  [2] 2 hours 45 minutes polycondensation time.

The results shown in the above table indicate that the presence of a hexafluorophosphate compound during the direct esterification step in the production of filament-forming polyester resin, in general, facilitates the preparation of and improves the prepolymer formed and in turn the polyester resin product. Through the use of such an additive, the direct esterification reaction time is reduced and the resulting prepolymer is, in general, characterized as being a more highly esterified product than one produced when no esterification additive is used, as indicated by the carboxyl content of the prepolymers. Further, the prepolymers of the present method can be condensed to yield polyester resins which have a high molecular weight, as indicated by their high intrinsic viscosity and melting point.

Various changes and modifications may be made practicing the invention without departing from the spirit and scope thereof, and therefore, the invention is not to be limited except as defined in the appended claims.

We claim:
1. In a method for preparing filament-forming polyethylene terephthalate wherein terephthalic acid and ethylene glycol are directly esterified and the product of esterification is polycondensed in the presence of a condensation catalyst, the improvement comprising carrying out the direct esterification reaction in the presence of a catalytic quantity of an etserification additive, containing phosphorous in its highest oxidative state (+5) in the form of a fluoro complex anion, selected from the group having the formulas $M(PF_6)_x$ and $NH_4PF_6 \cdot NH_4F$, wherein M represents a metal from Group I–A or VII of the Periodic Table or an $NH_4$-group or substituted $NH_4$-group where at least one hydrogen atom has been substituted with a lower alkyl radical containing from about 1 to 6 carbon atoms, $x$ is 1 where M is a monovalent metal or an $NH_4$-group or substituted $NH_4$-group and $x$ is 2 where M is a divalent metal.

2. The method of claim 1 wherein the additive compound is present in an amount ranging from about $5 \times 10^{-6}$ to about $5 \times 10^{-2}$ mole per mole of terephthalic acid.

3. The method of claim 1 wherein the additive is tetramethylammonium hexafluorophosphate.

4. The method of claim 1 wherein the additive is cesium hexafluorophosphate.

5. The method of claim 1 wherein the additive is nickel hexafluorophosphate.

6. The method of claim 1 wherein the additive is potassium hexafluorophosphate.

7. The method of claim 1 wherein the additive is ammonium hexafluorophosphate fluoride.

References Cited

UNITED STATES PATENTS 3,048,564   8/1962   Heffelfinger.

WILLIAM H. SHORT, *Primary Examiner.*

L. P. QUAST, *Assistant Examiner.*

U.S. Cl. X.R.

260—475

UNITED STATES PATENT OFFICE
CERTIFICATE OF CORRECTION

Patent No. 3,425,996                                                                     February 4, 1969

Mary E. Carter et al.

It is certified that error appears in the above identified patent and that said Letters Patent are hereby corrected as shown below:

Column 1, line 20, "VII" should read -- VIII --. Column 2, line 2, "oxdative" should read -- oxidative --; line 7, after "NH", first occurrence, insert -- $_4$ --; line 25 "and" should read -- about --; lines 29 and 30, cancel "However, when concentrations less than the above are used."; line 37, "molra" should read -- molar --. Column 4, line 8, "etserification" should read -- esterification --; line 12, "Group" should read -- Groups --; same line 12, "VII" should read -- VIII --; line 13, after "Table" insert -- (Merck Index, Sixth Edition) --. Columns 3 and 4, in the heading to the table, fifth column, line 3 thereof, "pg." should read -- kg. --.

Signed and sealed this 24th day of March 1970.

(SEAL)
Attest:

EDWARD M. FLETCHER, JR.                                        WILLIAM E. SCHUYLER, J
Attesting Officer                                                         Commissioner of Patent